United States Patent [19]  
Keith

[11] 3,955,019
[45] May 4, 1976

[54] CUSPATED SHEET FORMING
[76] Inventor: Donald George Keith, 32 Volitans Ave., Mount Eliza, Victoria 3930, Australia
[22] Filed: Apr. 16, 1974
[21] Appl. No.: 461,418

Related U.S. Application Data
[63] Continuation-in-part of Ser. No. 307,211, Nov. 16, 1972, abandoned.

[30] Foreign Application Priority Data

| Nov. 29, 1971 | Australia | 7210/71 |
|---|---|---|
| Mar. 8, 1972 | Australia | 8206/72 |
| Apr. 13, 1972 | Australia | 8598/72 |
| June 29, 1972 | Australia | 9523/72 |

[52] U.S. Cl. ............................ 428/35; 428/131; 428/156; 428/224; 428/174; 428/179; 428/256; 428/304; 264/92
[51] Int. Cl.² ...................... B32B 3/30; B32B 1/00
[58] Field of Search ........... 161/125, 130, 133, 135, 161/137, 75, 68, 69; 113/116 FF; 29/484; 52/613, 621, 626; 264/291, 292, 92, 322, 324; 428/174, 179, 224, 186, 304, 256, 35, 156, 131

[56] References Cited
UNITED STATES PATENTS

| 3,011,602 | 12/1961 | Ensrud et al. | 161/137 |
|---|---|---|---|
| 3,086,899 | 4/1963 | Smith et al. | 161/135 |
| 3,341,395 | 9/1967 | Weber | 161/133 |

Primary Examiner—George F. Lesmes
Assistant Examiner—Paul J. Thibodeau
Attorney, Agent, or Firm—Cushman, Darby & Cushman

[57] ABSTRACT

A laminate comprising a core consisting of a cuspated sheet consisting of a series of hollow projections projecting upwardly and downwardly from the median plane of said sheet and wherein the outer tips of the projections on the ends furthest from the median plane are closed and the ends of the projections in the median plane are open and wherein the projections form a series of pointed cusps said core laminated to a porous sheet wherein the points of the cusps on at least one face have been melted and at least partially allowed to impregnate the porous sheet.

13 Claims, 6 Drawing Figures

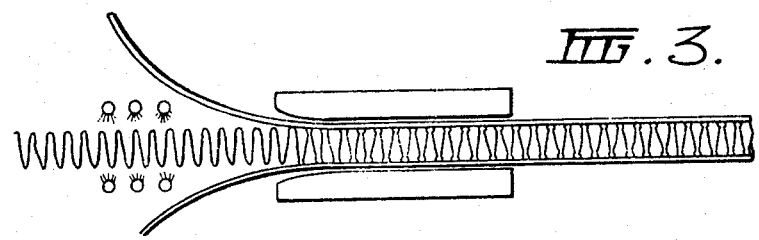
FIG. 3.
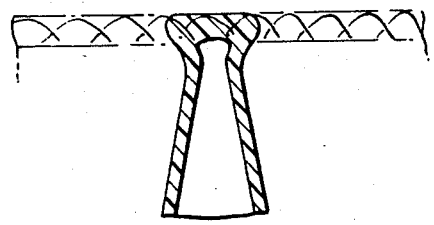
FIG. 4.
FIG. 6.
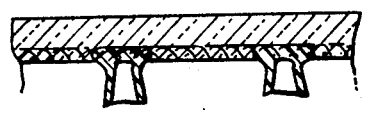
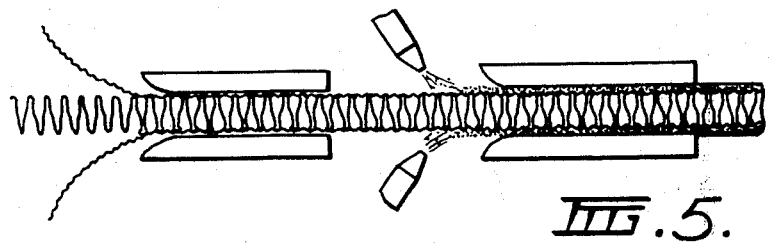
FIG. 5.

CUSPATED SHEET FORMING

This is a continuation-in-part of application Ser. No. 307,211 filed Nov. 16, 1972 and now abandoned.

This invention relates to products based on cuspated sheet. In particular it relates to laminated products having a cuspated sheet as core.

We provide a laminate comprising a core consisting of a cuspated sheet consisting of a series of hollow projections projecting upwardly and downwardly from the median plane of said sheet and wherein the outer tips of the projections on the ends furthest from the median plane are closed and the ends of the projections in the median plane are open and wherein the projections form a series of pointed cusps, said core laminated to a porous sheet wherein the points of the cusps on at least one face have been melted and at least partially allowed to impregnate the porous sheet.

Preferably the outer tip of each projection is thicker than the part of the sheet connecting the outer tips as this increases the ease with which the laminate may be prepared.

For maximum compressive strength we prefer that the ratio of height of cusp to maximum diameter of cusp is greater than 1.5 : 1 and less than 5 : 1. For cuspated sheet in which the points of the cusps form a regular square array the ratio of height of cusp to maximum diameter of cusp may be conveniently measured as the ratio of the depth of draw to the length of a side of the unit squares in the array.

The cuspated sheet may be either singly cuspated wherein all the outer tips of the hollow projections on one side of the median plane of said sheet are pointed and wherein the outer tips of the hollow projections on the other side of the median plane are in the form of a grid, the projections thus forming a regular array of pointed cusps on one side only of the sheet; or may be doubly cuspated wherein all the outer tips of the hollow projections on both sides of the median plane of said sheet are pointed, the projections thus forming a regular array of pointed cusps on both sides of the sheet.

The cuspated sheet may be prepared from any thermoplastic material.

The preferred thermoplastic materials having good melt spin properties are well known in the art and include, for example, vinyl polymers such as certain copolymers of vinyl chloride and vinyl acetate certain polyvinylidene chloride copolymers and certain copolymers of ethylene and vinyl alcohol; polyolefins such as low density polyethylene, high density polyethylene, polypropylene, high impact polystyrene and poly(4-methylpentene-1); polyesters such as poly(ethyleneterephthalate) and poly [1,(1-bis(methylene)-cyclohexaneterephthalate(1,2-cis:trans)]; polyamides such as nylon 66, 610, 6 and 11; inorganic glass such as soda or borosilicate glass; and thermoplastic rubbers.

The preparation of the cuspated sheet is described in application Ser. No. 307,211 filed Nov. 16, 1972, and now abandoned.

The nature of the porous sheet is not narrowly critical and may be made from any material which is stable at the softening temperature of the cuspated sheet and which has interstices into which the softened tips of the cusp may penetrate.

Suitable materials are for example fabrics, either woven or melded and made from either natural or synthetic fibre, in particular fabric woven from glass fibre; tissue; metal gauze and mesh; and finely perforated sheet material such as for example perforated metal sheeting. The size of the pores in the porous sheet must be sufficiently large to allow penetration of the molten thermoplastic core material into the pores.

In a further aspect of our invention we provide a process of manufacturing the laminates described hereinabove in which process the tips of the cusp on at least one face of a cuspated sheet are fused and simultaneously a porous sheet is pressed against the molten tips and held in place until the fused tips have solidified.

If cuspated sheet is placed in contact with a hotplate the cusps will fuse. We have found that if any porous sheet, such as a fabric, tissue, gauze or finely perforated sheet is placed between the tips of the cusps and a hotplate, and moderate pressure is applied as cusp fusion proceeds, the molten cusp will strike through the porous or fibrous layer, impregnating small areas with molten plastic. If the source of heat is now removed the porous or fibrous sheet will be strongly bonded to the cuspated sheet at a host of points, the plastics melt striking through to produce a rivet-like effect. Such a strike-through facing may be applied to one or both sides of a doubly cuspated sheet, or to one side of singly cuspated sheet.

We have found that strike-through composites based on a strong double sided cuspated core with woven or non woven fabrics as both facings have a unique combination of properties. Such composites may retain great suppleness and pliability: indeed if the fabrics are extensible as for example if knitted fabrics are used the entire composite will readily deform to fit compound curves. However despite their suppleness the compressive strength of the laminate remains unabated. These composites thus combine suppleness with great constancy of thickness and load bearing ability. Lightweight and relatively cheap materials of this type can be employed as screens, lightweight building sheets, heavy tentage and as substance serving as padding or surface in upholstery.

Where strike-through laminates are specifically to be made with a metal fabric or metal porous sheet such as metal gauze or metal filigree then a special method of assembly may be employed. We have found that the metal fabric may be heated, for example, by open flame immediately before the act of assembly.

The production of strike-through laminates is shown in the accompanying diagrams.

Figure 1:
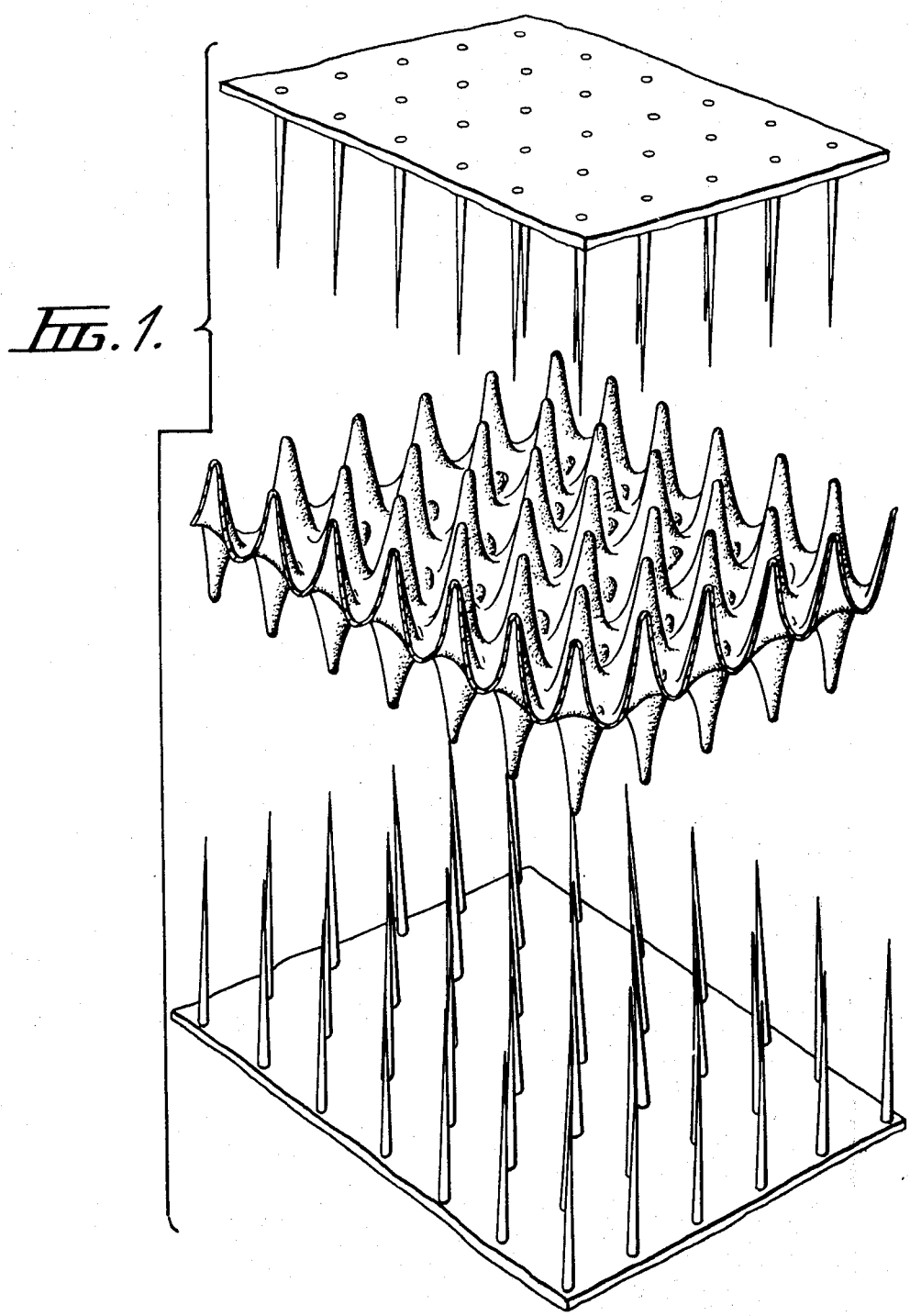
FIG. 1 illustrates the formation of a cuspated sheet by means of interacting upper and lower arrays of needles.

In FIG. 3 a previously made "doubly cuspate" core sheet of thermoplastic material is being drawn continuously between heated plates while preheated surfacing sheets are applied under controlled pressure. Heat is also applied just before assembly by heaters located in the axis of the process. The facing sheets may be fibrous or porous.

FIG. 4 shows a fibrous sheet-to-cusp weld, the molten cusp-tip effectively impregnating the fabric.

FIG. 5 shows a core previously made or produced in line, first being fabric faced by strike through then supplied with curing resin from nozzles and cured by hot-plates.

FIG. 6 shows a section of a laminate bonded by means of cusps strike through with additional fabric and resin.

A thermoplastic sheet may be "bulked" by some arbitary bulkiness factor. The bulkiness factor is the factor by which the density of the original sheet must be multiplied to give the apparent density of the cusped sheet. The apparent density is defined as the weight of material lying between the planes of the cusp-tips, divided by the volume between these planes. For each bulkiness factor there is an optimum cusp frequency (or unit lattice distance) in terms of the compression and shear strengths of the cuspated sheet. At such optimum depths of draw the ratio of cusps height to maximum diameter of cusp is usually within the range from 1.7 to 2.3.

By the methods of our prior invention we easily can exceed this "optimum" draw depth. Furthermore we easily control the amount of material forming the cusp tips by controlling the mass, taper, initial temperature and time of contact with molten sheet of the needles employed.

We have found that if cuspated sheet previously formed is placed in contact with a hotplate at a temperature above the softening point of the material, and pressure applied, local melting at the cusp-tips occurs and the molten material extrudes to form discs or flanges. To prevent adhesion to the hotplate some release material or coating is essential. Termination of cusp melting by removal from the heat source produces a product having flattened cusps on one or both sides. By control of time, pressure and relative movement of heat source and cuspated sheet any desired extent of melt-back can be attained as a fraction of the original depth of draw. During the melt-back operation any pressure applied is borne almost entirely by the unmelted shanks of the cusps, for as material melts it is readily extruded sidewise. One can thus calculate that the effective pressure applied to the cuspated sheet as a whole is multiplied at the cusps by the ratio of plan area to cusp shank area, a factor typically ranging from forty to two hundred. Thus considerable force may be exerted on the cusp shank and this in turn can be supported because of the robust and thick cusp end and shank typical of the cuspated sheet. This local pressure is essential if highly viscous or visco-elastic melts are to permeate finely porous fabrics or gauzes.

Composites in which porous or woven surface sheets are hot bonded to a cuspated core are especially suitable for later strengthening of the fabric sheets by casting resins or other self hardening layers so that the hot-bonded fabric acts as a reinforcement. Accordingly in a further application of our invention we provide a laminate as described hereinabove wherein the porous sheet is embedded in a facing sheet.

If fabric or fibre faced composites are moistened with suitable hardenable fluids, such as for example thermosetting polyester or epoxy resins, cement slurries, casting polyurethanes, rubber latices, etc. with or without the addition of extra fibrous material, then reinforced sheet, panel or shapings with a structural cuspated sheet core are obtained. Because of the increased beam depth such objects in reinforced plastics have greatly enhanced specific stiffness. It is important to stress however that because of the quality of constant core thickness even when the sheet as a whole is deformed, open cored structures can frequently be produced without matched moulds by merely pressing the reinforced laminate against a single mould by rubber bag or vacuum bag, etc. By such means large structurally efficient laminates can be produced as for example in design of boats, vehicle bodies, containers, tanks, large bore pipes, etc.

The nature of the porous sheet is not narrowly critical but we have found that a glass-fibre scrim is of particular use in the manufacture of non-planar or planar laminates comprising cast polyester facing sheets. Metal gauze such as steel gauze is of particular use in forming structural panels faced with concrete or plaster.

Composites comprising a porous sheet embedded in the facing sheet derive advantage from the particular assembly system of our invention. The core is strongly bonded to the porous facing sheet by a multiple rivet effect, the connection being mechanical and readily assessed by visual inspection: in its turn the porous sheet is mechanically trapped in the adhesive or cast surface layer and serves as a structurally communicating layer ensuring that applied forces are shared over many cusps.

We have found that when porous or woven metal sheets or fabrics are used heat may be supplied by raising the metal fabric to a relatively high temperature then swiftly placing it between the cusps of the core and a facing sheet of thermoplastic material so that in surrendering its heat the metal locally fuses the plastics surfaces which permeate its open structure at the same time as fusing the cusps. The plastic solidifies, locking the metal in place, as the assembly cools. For example cuspated sheets may be jointed cusp to cusp by clamping the sheets in register over hot wire gauze. In an alternative method the subassembly may be made up with metal fabric cold, and at a subsequent stage the metal may be heated electrically for example by induction or resistance.

The cuspated sheet/porous sheet laminates described hereinabove are also of use in the manufacture of laminates having a facing sheet stuck to the outside face of the porous sheet.

Accordingly in a further application of our invention we provide a laminate as described hereinabove wherein the porous sheet has been impregnated with an adhesive and a facing sheet has been glued to the porous sheet by means of the adhesive.

Compatible adhesives for bonding any given facing sheet are well known to those skilled in the art. For example suitable adhesives for bonding polymethyl methacrylate facing sheets onto a fibre glass scrim include a polymerising acrylic cement.

The advantage of these laminates is that they may be cheaply constructed. Facing sheets are not easily glued directly to the points of a cuspated sheet as the area of contact is not large and therefore the gluing must be done extremely carefully. Using a laminate of our invention the area of contact between laminate and facing sheet is large and therefore the gluing is relatively easy.

A further advantage is that the glue need only be compatible with the facing sheet. The bond with the porous sheet may be soley mechanical entrapment of the adhesive in the interstices of the porous sheet; By contrast the adhesive used to glue a facing sheet directly to a cuspated sheet must be compatible with both the facing sheet material and with the core material.

Laminates formed in this manner may be used as wall panels, translucent ceiling panels, vehicle body panels, components of crates, furniture etc.

Composite structures of the forms described are not necessarily planar, for if the core is constrained to a shape before hot-bonding fabric faces, such shape of single or compound curvature will be retained in the laminate: cylindrical or domed shapes may be made.

Such composite structures may be formed either batchwise or continuously.

Laminates having the porous faces sealed by casting or cementing further layers are exceptionally strong under tension generated by internal fluid pressure. That is, such structures are capable of serving as pressure vessels if steps are taken in assembly to incorporate a bounding edge strip. For example a panel of such a type may be erected on a site and subsequently filled with sand, fluid cement or plaster, or with a non hardening liquid. These possiblilities arise from the strength in tension of our cuspated core materials along the cusp axes, and from the strong bonds obtainable between cusps and such sheets as fine steel mesh. Since the cuspated core will accept steel rods in at least two directions, subsequent fill of such open-core panels can yield reinforced concrete panels, the laminate acting as its own shuttering. Moreover by including verticl septa in the assembly the infill casting may be confined to sub-modules of the wall panels, giving limited regions of reinforcement or connection.

The invention is now illustrated but no no means limited to the following examples:

EXAMPLE 1

Two square arrays of sharp needles were mounted in a light handpress capable of bringing the parts together in register. The upper and lower arrays were offset so that any needle of the upper set would enter the centre of a square of four of the needles of the lower set; in effect the arrays were staggered to give uniform interdigitation (FIG. 1).

The "unit square" distance in each array was ½ inch and the free needle height 1 inch. Polyethylene film specimens, clamped in an open frame comprising hinged square annuli were fused to thermoforming temperature by being held in proximity with a radiant hotplate, and quickly placed between the jaws of the press.

The arrays at ambient temperature were allowed to interdigitate under low pressure. Countercuspate shapings were produced. It was found that polyethylene film ranging from thicknesses of 0.006 inch to 0.100 inch could be drawn to depths of 1 inch, giving increases in surface area up to 500%. The rate of draw giving best results required 1 to 2 seconds for a "mould" interpenetration of 1 inch. Under these conditions the resulting maximum stretch had occurred in the mid region while the tips of the cusps remained relatively unthinned. Similar results were obtained using sheets of polypropylene.

EXAMPLE 2

The experiments of Example 1 were repeated using arrays of fine needles only 0.08 inch apart and 0.4 inch high and fine structured cuspated sheet with a texture resembling coarse velvet was obtained.

EXAMPLE 3

The experiments of Example 1 were repeated using two arrays one of which comprised a triangular array of needles ¼ inch apart and free needle height ½ inch and the other array comprised a hexagonal sharp edged aluminum honeycomb of ¼ inch scale between the cell centres.

Figure 2:
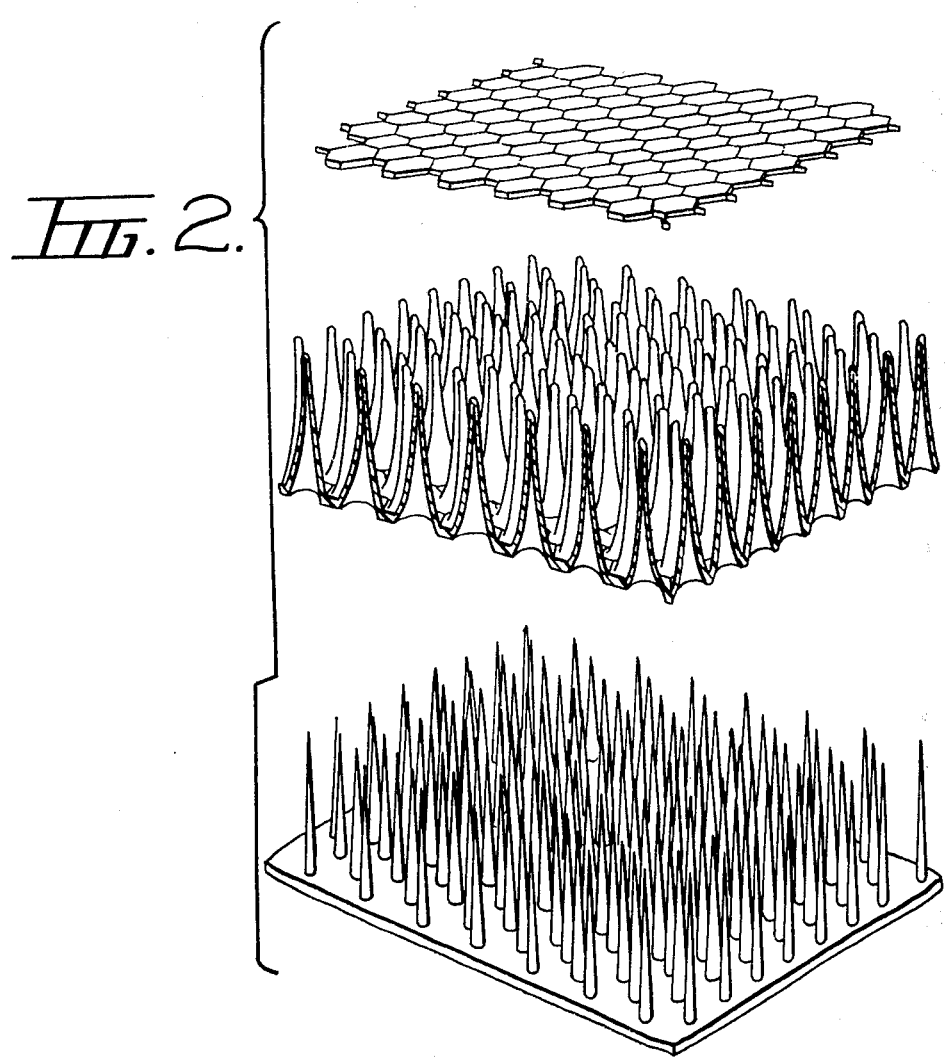
FIG. 2 illustrates the formation of a cuspated sheet by means of an upper honeycomb structure which interacts with a lower array of needles.

The triangular array of needles was mounted in a light hand press so that each needle entered the centre of the hexagonal orifice of aluminum honeycomb (see FIG. 2).

Using specimens of polythene and polypropylene in the thickness range 0.100 inch to 0.600 inch cuspated products having hollow fibrils on one side only were produced.

EXAMPLE 4

The experiments of Example 1 were repeated using various different moulds, materials and depth of draw. The results are shown in Table 1:

TABLE I

| MATERIALS | THICKNESS INCHES | DEPTH OF DRAW INCHES | MOULD LATTICE | PITCH | COMMENTS |
|---|---|---|---|---|---|
| Low density polyethylene, High density polyethylene, Polypropylene, High impact Polystyrene, Saran. | 0.012 | ⅛, 3/16, ¼, ⅜. | Square doubly cusped | 0.060 | Fine grain product of good quality |
| | 0.020 | 3/16, ¼ ⅜, ½. | " | " | As above: products stronger |
| | 0.040 | ¼, ⅜, ½, ⅝. | " | " | Products of maximum weight for this mould. |
| Nylon 610 | 0.032 | ½, ¾. | " | " | Gives very deep draw. |
| LD and HD Polyethylene H.I. Styrene Toffee | 0.040 | ½, ¾, 1. | Hexagon single cusped | 0.125 | Brushlike unperforated. Moulds well. |
| Unplasticised PVC | 0.030 | ⅛ | " | 0.125 | Unsatisfactory; punctures |
| Plasticised PVC | 0.030 | ⅛ | " | | or fails to draw |
| Polymethyl methacrylate | 0.18 0.32 | ⅛ ⅛ | " " | " | Will not draw |
| All polyolefines, nylon 66, 610, 6, Toffee, Glass | 0.060 0.090 0.125 0.200 | ¼, 1.6 | Square doubly cusped | 0.250 | All excellent products |

TABLE I-continued

| MATERIALS | THICKNESS INCHES | DEPTH OF DRAW INCHES | MOULD LATTICE | PITCH | COMMENTS |
| --- | --- | --- | --- | --- | --- |
|  | 0.240 |  |  |  |  |
| P.V. Alcohol | 0.090 | ⅜ | '' | '' | Tends to puncture |
| Low density polyethylene/ vinyl alcohol copolymer 80/20 | 0.060 0.100 0.150 | ⅜, 1.4 | '' | '' | Excellent medium; semi elastic |
| 'Cariflex' 2104 'Krayton' grades 'Solprene' grades | 0.010 0.150 | ⅛, ⅜, ½ ¾ | Various moulds |  | Adequate medium |
| Nylons High impact styrene, Toffee, Cariflex 210, Low density polythene, High density polythene, Poly(4-methylpent- ene-1) | 0.040 0.060 0.090 0.120 0.180 | ½, ¾, 1, 1½ | Triangle bi-cusped | ½ | All mould well giving unperforated products. |
| Soda glass, Saran, Toffee, Low density and High density polythene, Polypropylene, H.I. polystyrene | 0.020 0.040 0.060 | ¼, ⅜ | Zigzag ½, 60 | Ridge to ridge ¼'' | Especially easy to mould, can be compressed and hot set |
| Polyethylenes, "Krayton", Polypropylene | 0.150 0.220 | 1, 1½, 2 | Zigzag 1'' 45 | Ridge to ridge 1'' | Large zigzag, good springy sheets |
| Kraytons L.D. polyethylene H.I. polystyrene | 0.125 0.180 | 2, 3 | Zigzag 2'', 50° | Ridge to ridge 1½'' | Giant two way stretch |
| H.I. Styrene, Polyethylenes, Polypropylene, Poly(4-methyl-pentene-1) | 0.125 0.250 | 6, 9 | Triangle single cusped | 2'' | Extreme cusps |
| A.B.S. | 0.125 | 1 | '' | '' | Barely draws |
| Soda glass | 0.125 | 10 | '' | '' | Decorative |
| 'Krayton' polyethylene, low and high density | 0.125 | ½, ⅝ | Parallel knife edges | ¼'' | Corrugated with heavy edges |
| Gelatine 15% water at 90°C | 0.070 | ½ | Square | ¼'' | Workable medium |

EXAMPLE 5

Soda glass sheet 3/16 inch thick was carefully and slowly heated to 950°C then shaped at a rate of 1 inch/second in a mould comprising a double cuspate square array of steel needles with lattice pitch of ½ inch. The depth of draw was 2 inch. Cooling of the glass occurred swiftly by radiation and time in the mould was only 15 seconds. Excellent cuspated glass sheet was produced.

The cuspated glass sheet was substantially stress free and did not require annealing. The experiment was repeated using the following materials:

| Material | Thickness |
| --- | --- |
| Soda Glass | 0.250'' |
| Soda Glass | 0.125'' |
| Soda Glass (Red) | 0.100'' |
| Soda Glass (Anti-glare Grey) | 0.170'' |
| Borosilicate Glass | 0.085'' |
| Borosilicate Glass | 0.125'' |

In each case unperforated cuspated sheet was prepared of excellent quality.

EXAMPLE 6

This example demonstrates the effect of change of the ratio of depth of draw to unit square distance on compressive yield strength of the cuspated sheet.

Cuspated sheets were prepared by the method of Example 1 except that the unit square distance was ¼ inch. Sheets of material of different thickness and nature were drawn to varying depths as shown in Table 2. The compressive yield strength of the resultant cuspated sheets was measured by ASTM Method D1621-64

TABLE 2

| MATERIAL | THICKNESS (INCHES) | BULK DENSITY (16/ft 3) | DEPTH OF DRAW (INCHES) | RATIO OF DEPTH DRAW% UNIT SQUARE DISTANCE | COMPRESSIVE YIELD STRENGTH (psi) |
| --- | --- | --- | --- | --- | --- |
| Low density polythene | 0.010 | 1.5 | 0.31 | 1.2 | 3.5 |
|  | 0.018 | 1.5 | 0.6 | 2.4 | 4.5 |
|  | 0.036 | 1.5 | 1.0 | 4.0 | 2.0 |
|  | 0.010 | 2.0 | 0.25 | 1.0 | 5.0 |
|  | 0.018 | 2.0 | 0.5 | 2.0 | 9.5 |
|  | 0.036 | 2.0 | 0.75 | 3.0 | 5.4 |

TABLE 2-continued

| MATERIAL | THICKNESS (INCHES) | BULK DENSITY (16/ft 3) | DEPTH OF DRAW (INCHES) | RATIO OF DEPTH DRAW% UNIT SQUARE DISTANCE | COMPRESSIVE YIELD STRENGTH (psi) |
| --- | --- | --- | --- | --- | --- |
| | 0.018 | 3.0 | 0.33 | 1.3 | 14 |
| | 0.036 | 3.0 | 0.55 | 2.2 | 21 |
| | 0.063 | 3.0 | 0.85 | 1.4 | 8.4 |
| | 0.018 | 4.0 | 0.25 | 1.0 | 17 |
| | 0.036 | 4.0 | 0.5 | 2.0 | 35 |
| | 0.063 | 4.0 | 0.75 | 3.0 | 24 |
| High impact polystyrene | 0.010 | 2.0 | 0.3 | 1.2 | 23 |
| | 0.020 | 2.0 | 0.6 | 2.4 | 50 |
| | 0.040 | 2.0 | 1.2 | 4.8 | 12 |
| | 0.010 | 2.5 | 0.24 | 0.9 | 32 |
| | 0.020 | 2.5 | 0.47 | 1.9 | 84 |
| | 0.040 | 2.5 | 0.95 | 3.8 | 40 |
| | 0.020 | 4.0 | 0.27 | 1.1 | 125 |
| | 0.040 | 4.0 | 0.6 | 2.4 | 170 |
| | 0.063 | 4.0 | 1.0 | 4.0 | 62 |

EXAMPLE 7

A polypropylene extruded sheet 3 mm thick cuspated to form a core sheet effectively 60 mm thick having cusps both sides on a 20 mm square lattice, in a cool state, was pressed between two flat hotplates at a uniform temperature of 250°C for 80 seconds, and at a pressure of 0.5 psi, provision being made to restrict the approach of the hotplates to a parallel distance of 52 mm. Silicone treated paper was used as a release layer. The cusps melted back to produce flanged ends 5 mm in diameter, when the core was removed and cooled. Steel mesh of 2 mm square openings based on 0.046 inch wire was now placed each side of the core, release paper placed on the mesh and hotplate remelting was resumed for 150 seconds reducing the composite thickness to 44 mm. The cooled product was found strongly bonded by strike through into the mesh at each cusp. At a later operation a ⅜ inch layer of concrete was cast to embed one face, then the other, producing a hollow panel of polypropylene core strongly bonded to concrete via steel mesh.

EXAMPLE 8

To construct a large shallow cylindrical composite, one free end of a doubly cuspate laminate strip 6 inches wide, fourteen feet long was fixed to a simple rotatable mandrel in the form of a drum 12 inch diameter. Set up also adjacent to the mandrel was a strip of 30 mesh to the inch copper gauze 6 inches wide, fourteen feet long, capable of being fed through a strip-flame able to raise the gauze to red heat by passage through the flame at a rate of 5 feet/minute. Rotation of the mandrel caused cuspated core and foil both to wind up under low tension. We employed a 1 inch deep ¼ inch pitch polypropylene double cusped core drawn from 0.1000 inch sheet. On winding this system, the red hot gauze, weighing about ¼ lb sq. ft. first of all fused any cusps with which it came in contact, but at once its limited heat content became dissipated and the system cooled as a concentric laminate in which further plies were steadily added until the materials were fully wound on the mandrel as a four layer cylindrical "swiss roll" composite.

By like means small tags of gauze held in pliers may be flame heated and used as rapid bonding means for subassemblies of cuspated core materials rigid or elastomeric.

EXAMPLE 9

"Strikethrough" laminates were prepared by placing fibrous sheet on cuspated core, pressing a hotplate against it for long enough to melt and flatten the tips of the cusps so that molten plastics impregnated the areas of contact and cooling the assembly until the bond had hardened. A wide range of cores was bonded to fibrous or porous sheets as shown in Table 3. The cuspated core was made by the method of Example 1.

TABLE 3

| CORE | FACING(S) | COMMENT |
| --- | --- | --- |
| Mould<br>Bicuspate, square lattice, 0.060 pitch<br>Depth of draw<br>⅛", ¼", ⅜"<br>Material<br>Low density polyethylene<br>High density polyethylene<br>Polypropylene<br>All .040" thick | Each variant was faced with 200 mesh stainless steel gauze; 60 mesh polyester fibre silk screen cloth; on both sides. | These composites were strongly bonded without puncturing the cuspated core |
| Mould<br>Singly cuspate hexagonal lattice, ¼" pitch | Each variant faced on cusped side with:<br>0.020 bronze mesh<br>Fine weave linen; | Composites of reduced pliability |

TABLE 3-continued

| CORE | FACING(S) | COMMENT |
|---|---|---|
| Depth of draw<br>½", ¾", 1"<br>Material<br>Polypropylene,<br>High impact styrene,<br>Each 0.150" thick | Fine warp knit fabric;<br>10 mesh glass fibre scrim | |
| Mould<br>Bicuspate square lattice,<br>¼" pitch<br>Depth of draw<br>½", ¾", 1"<br>Material<br>Polypropylene,<br>Low density polyethylene,<br>All drawn from sheet 0.150" thick | Each variant faced with:<br>Medium weight glass fibre cloth;<br>Polyester fibre light duck;<br>50 mesh wire gauze;<br>Coarse nylon knit material. | Composites pliable and of easy handle in polyethylene and knit fabric, stiff and leathery in polypropylene and straight weave fabrics. |

The strikethrough laminates prepared above can be used as cores for rigid laminates. Strikethrough laminates having a core formed from a mould having a bicuspate, square lattice, ¼ inch pitch from polypropylene 0.100 inch thick and drawn to a depth of ¾ inch laminated to glass fibre cloth were bonded with adhesives to plywood, hardboard, window glass, cast acrylic sheet and sheet steel. In each case a strong bond was obtained between the core and the facing sheet.

EXAMPLE 10

Samples of all the composites (except those faced with metal fabric) shown in the strikethrough laminates listed in Table 3 were wetted with a liquid thermosetting polyester resin catalysed to cure at room temperature. In each case the fabric layer became a hard skin. In addition samples of all the composites faced with fibreglass tissue or fibreglass woven fabric in Table 3 were wetted with fluid epoxy resin suitably catalysed, and two additional layers of woven glass fibre fabric were added then impregnated with the same epoxy resin. The composites were clamped between polished plates faced with cellophane and cured for 1 hour in an oven at 70°C. In each case strong panels were obtained, comprising two glass reinforced plastics sheets bonded to and spaced by the flattened cuspated strikethrough core.

Finally a sample of the polypropylene 1 inch bicuspate core faced on both sides with knitted nylon (the last example on Table 3) was wetted with polyester resin, sprayed with fibreglass rovings to the weight of 8 oz. sq. yd. and wetted out with further resin. This sample was constrained against the spherical surface of a large porcelain crucible, and cured, as a strong laminate of compound curvature.

EXAMPLE 11

This example is a composite example which demonstrates the disadvantages of the laminates compound and core mechanically embedded and locked into a facing sheet without use of a fabric.

A "doubly cuspated" moulding 1 inch deep drawn from 0.125 inch polypropylene on the sharp mould of Example 1 was placed between sheets of release paper in a hot platen press under light pressure, the platens being at 200°C. Within 20 seconds the cusps began to melt and in a further 10 seconds the moulding was removed. Thickness was now ¾ inch and the cusps had formed mushroom shaped flat bases.

A facing sheet of a diallyl phthalate polyester resin was cast so as to embed the flattened tips of the cusps. On applying shear force the cusp caused spalling of the polyester resin.

A similar laminate according to our invention prepared using a fibre glass scrim melt moulded to the cusp withstood a similar shear force without spalling.

EXAMPLE 12

Several samples of cuspated core 40 inches wide and 10 feet long were produced from polypropylene 0.250 inch thick prepared by the process of Example 1 using a bicuspate design of a square lattice of 2 inch unit square at a draw depth of 5 inch. This core was bandsawn into strips 10 inches wide which were then assembled with strips of ¼ inch sheet polypropylene 5 inches wide as vertical partitions between strips of cuspated core. The subassemblies so made were approximately 100 inches long 40 inches wide comprising 4 cuspated core strips 10 inches wide with partition strip at each side of the cuspated core strips. Strip material was also affixed round the boundary of the assembly, one length 240 inches long being used. This subassembly was placed centrally on two lengths of 12 × 12 steel mesh of 0.020 inch wire measuring 100 inches × 44 inches so that 4 inches of mesh extended beyond the assembly on one side. This entire assembly was placed between hotplates at 230°C and the cusps fused until the resulting mesh faced laminate had melted back to 4 inches thick. The wire mesh faced panel so produced was aligned with four similar panels, the 4 inches of mesh overlap being spot welded at a few points. A thin sheet of concrete ⅜ inch thick was cast on one face then the other so that the mesh was embedded. The cured and dry unit measured 13 feet 4 inches × 8 feet 4 inches × 4 inches and when stood on edge formed a wall section 8 feet 4 inches high. Alternate 10 inches sections were filled at any time with a fluid, a hardenable slurry or a particulate material. By like methods we produced prefabricated wall sections precut with door and window orifices, and we showed that by use of grommeted holes in the partition strips reinforcing rod could be passed through the wall in either vertical or horizontal altitude. Moreover by suitable preparation pipes, electric cables or other services could be emplaced within the system. The hollow prefabricated walls so made were very strong when unfilled: partial or complete concrete fill would be required only to bear exceptional loads such as producing columns for multi-storey work.

EXAMPLE 13

A doubly cuspated core sheet of polyethylene terephthalate was formed by the process of claim 1 on blow extruded sheet of layflat thickness 0.060 inches, the draw depth being 1¼ inches on a ⅝ inches square lattice design. To each side a stout glass fabric was hot struck on and the composite thickness was thereby reduced to 1 inch. The free fabric edges were upturned and stitched round all edges and a reinforced valved rubber spigot was placed in one end edge. The entire fabric of the assembly was now saturated and coated with a catalysed rubber latex and cured. The mattress sized object so made was found able to contain air pressure of up to 70 psi and under pressure formed a strong panel for use as a temporary shelter component.

EXAMPLE 14

A cuspated core similar to that in the foregoing but made of polypropylene had struck onto each side a heavy random glass fibre tissue. During the assembly an edge sealing strip of plastic was struck on to form a surrounding edge piece. The edge strip was connected by spigot to a vacuum source and while suction was applied the porous panel was sprayed with chopped strand glass fibre. Suction was then reduced and catalysed polyester resin sprayed on. The finished assembly was then placed between matched gel-coated moulds and cured.

EXAMPLE 15

A core similar to that of example 14 was provided with edge strip all round and provided with an entry spigot, but light glass fibre scrim was struck on as facings. A controlled quantity of wood pulp was now injected into the panel and the water removed by external vacuum. The resulting panel when dry was a panel faced with moulded pulp intimately locked into the interstices of the struck-on glass scrim.

EXAMPLE 6

Ten layers of cuspated sheet similar to the core of example 14 were laid one on the other cusp to cusp but separated by sheets of copper gauze, each free end of gauze being connected to a source of electric current. A light pressure was applied to the stack and a transient pulse of current sufficient to raise the gauze layers to dull red heat was switched on. On cooling, the stack was formed to be well bonded into a single strong assembly. Such composite structures are of use in electrostatic precipitation.

EXAMPLE 17

The cuspated sheet similar to the core of Example 14 was found to fit the holes of a perforated metal sheet of similar lattice, the holes being large enough to allow the cusp tips to pass through. Thin polypropylene sheet was placed on release paper on a hotplate and the core carrying a sheet of perforated metal on its cusps was at once applied. Under light pressure the cusps bonded to the flat plastic sheet at the openings in the metal. The procedure was repeated on the other side. This yielded a laminate in which perforated metal enhanced strength by being entrapped in each face.

EXAMPLE 18

A cuspated sheet similar to that described in Example 12 was bonded to previously corrugated steel mesh of 2 inches "wavelength" so that on one face the mesh defined a corrugated surface. This was done by heating the corrugated mesh over a set of electrically heated rods. The steel mesh was sealed by low melting solder.

EXAMPLE 19

A rubbery bicuspated core of the pattern described in Example 12 was formed from a thermoplastic rubber. Strong linen was stuck on to both surfaces giving a cushioning composite.

EXAMPLE 20

This example demonstrates the effect of change of the ratio of depth of draw to unit square distance on compressive yield strength, flexural yeild strength and modulus of elasticity in flexure for laminates prepared by the process of our invention.

Cuspated sheets were prepared by the method of Example 1. The sheets were faced on both sides with a facing sheet by means of a 40 mesh 26 SWG gauge copper mesh heated to 600°C and inserted between the cuspated sheet and the facing sheet. On pressing the facing sheet against the cupated sheet the heat from the copper mesh caused fusion of the tips of the cusps and of the inner surface of the facing sheet. On cooling the facing sheet was found to be strongly welded to the laminate.

The material of the construction, core sheet thickness, skin sheet thickness, depth of draw, ratio of depth of draw to unit square distance, compressive yield, strength of core, compressive yeild strength of laminate, flexural yeild strength of laminate and modulus of elasticity of lexure of the laminate are shown in Table 4.

TABLE 4

| Material | Thickness of core sheet (inches) | Thickness of skin sheet (inches) | Depth of Draw for core (inches) | Ratio of Depth of Draw/ Unit Square Distance | Compressive* Yield Strength of core (lb/in²) | Compressive* Yield Strength of Laminate (lb/in²) | Flexural** Yield Strength of Laminate (lb/in²) | Modulus* of Elasticity in Flexure (lb/in²) |
|---|---|---|---|---|---|---|---|---|
| Low density polyethylene | 0.036 | 0.010 | 0.53 | 2.1 | 33.5 | 67 | 97 | 4600 |
| | 0.036 | 0.018 | 1.05 | 4.2 | 3.7 | 5.2 | 215 | 8300 |
| | 0.018 | 0.036* | 0.46 | — | 1.8 | 21 | — | — |
| | 0.036 | 0.018 | 0.48 | — | 10.2 | 80 | 254 | 7200 |
| Polypropylene | 0.023 | 0.012 | 0.98 | 3.9 | 4.9 | 20.8 | 150 | 4700 |
| | 0.023 | 0.012 | 1.13 | 4.5 | 2.9 | 10.8 | 51 | 1900 |
| | 0.023 | 0.023 | 0.98 | 3.9 | 4.9 | 42 | 267 | 12700 |
| | 0.023 | 0.023 | 1.13 | 4.5 | 2.9 | 20.3 | 59 | 1600 |
| | 0.023 | 0.036 | 0.98 | 3.9 | 4.9 | 68 | 510 | 17000 |
| | 0.023 | 0.036 | 1.13 | 4.5 | 2.9 | 6.3 | 101 | 3500 |
| | 0.036 | 0.012 | 0.70 | 2.8 | .64 | 102 | 200 | 6300 |

TABLE 4-continued

| Material | Thickness of core sheet (inches) | Thickness of skin sheet (inches) | Depth of Draw for core (inches) | Ratio of Depth of Draw/ Unit Square Distance | Compressive* Yield Strength of core (lb/in²) | Compressive* Yield Strength of Laminate (lb/in²) | Flexural** Yield Strength of Laminate (lb/in²) | Modulus* of Elasticity in Flexure (lb/in²) |
|---|---|---|---|---|---|---|---|---|
| | " | " | 0.98 | 3.9 | 13 | 33 | 69 | 2300 |
| | " | " | 1.13 | 4.5 | 5.4 | 10.4 | 26 | 1300 |
| | 0.036 | 0.023 | 0.98 | 3.9 | 13 | 35 | 102 | 3400 |
| | 0.036 | 0.023 | 1.13 | 4.5 | 5.4 | 14.5 | 32 | 1600 |
| | 0.036 | 0.036 | 0.70 | 2.8 | 64 | 111 | 500 | 16000 |
| | " | " | 0.98 | 3.9 | 13 | 43 | 150 | 4300 |
| | " | " | 1.13 | 4.5 | 5.4 | 16.2 | 52 | 2100 |
| | 0.075 | 0.012 | 0.70 | 2.8 | 182 | 342 | 350 | 13000 |
| | " | " | 0.98 | 3.9 | 45 | 113 | 162 | 3700 |
| | " | " | 1.13 | 4.5 | — | 39 | 66 | 3400 |
| | 0.075 | 0.023 | 0.70 | 2.8 | 182 | 227 | 520 | 14000 |
| | " | " | 0.98 | 3.9 | 45 | 72 | 189 | 4100 |
| | " | " | 1.13 | 4.5 | — | 37 | 85 | 4000 |
| | 0.075 | 0.036 | 0.70 | 2.8 | 182 | 353 | 1160 | 25000 |
| | " | " | 0.98 | 3.9 | 45 | 72 | 250 | 6500 |
| | " | " | 1.13 | 4.5 | — | 34 | 85 | 4000 |

*Compressive Yield Strength measured according to ASTM Method D1621-64
**Flexural Yield Strength and Flexural Modulus of Elasticity determined according to ASTM Method D790-63.

I claim:

1. A laminate comprising a porous sheet and a core which includes a single or double cuspated sheet of melt-spinnable thermoplastic material having a series of hollow projections projecting upwardly and downwardly from the median plane of said sheet and wherein the outer tips of the projections on the ends furthest from the median plane are closed and the ends of the projections in the median plane are open and wherein the projections form a series of pointed cusps, the points of the cusps on at least one face having been melted and at least partially allowed to impregnate into the pores in the porous sheet thereby laminating said sheet to said core, said porous sheet being selected from the group consisting of fabrics, either woven or melded and made from either natural or synthetic fibre, tissue; metal gauze and mesh; and finely perforated sheet material.

2. A laminate according to claim 1 wherein the outer tip of each projection is thicker than the part of the sheet connecting the outer tips.

3. A laminate according to claim 1 comprising a core sheet wherein the ratio of height of cusp to maximum diameter of cusp is greater than 1.5 : 1 and less than 5:1.

4. A laminate according to claim 1 wherein the cuspated sheet is singly cuspated, all the outer tips of the hollow projections on one side of the median plane of said sheet are pointed and wherein the outer tips of the hollow projections on the other side of the median plane are in the form of a grid, the projections thus forming a regular array of pointed cusps on one side only of the sheet.

5. A laminate according to claim 1 wherein the cuspated sheet is doubly cuspated wherein all the outer tips of the hollow projections on both sides of the median plane of said sheet are pointed, the projections thus forming a regular array of pointed cusps on both sides of the sheet.

6. A laminate according to claim 1 wherein the cuspated sheet is made of a material chosen from the group consisting of copolymers of vinyl-chloride and vinyl acetates, low density polyethylene, high density polyethylene, polypropylene, high impact polystyrene and poly(4-methylpentene-1); poly(ethyleneterephthalate) and poly [1,(1-bis(methylene)cyclohexaneterephthalate(1,2-cis:trans)]; nylon 66, 610, 6 and 11; soda or borosilicate glass; and thermoplastic rubbers.

7. A laminate according to claim 1 wherein, after the points of the cusps have been melted and at least partially allowed to impregnate the porous sheet the porous sheet is embedded in a facing sheet.

8. A laminate according to claim 7 wherein the porous sheet is glass fibre scrim and the facing sheet is a cast polyester resin.

9. A laminate according to claim 7 wherein the porous sheet is metal gauze and the facing sheet is concrete or plaster.

10. A laminate according to claim 7 wherein the porous sheet has been impregnated with an adhesive and a facing sheet has been glued to the porous sheet by means of the adhesive.

11. A laminate according to claim 7 wherein the core is at least partially filled with fluid cement or plaster.

12. A process of making a laminate according to claim 1 wherein the tips of the cusps on at least one face of a cuspated sheet are fused and simultaneously a porous sheet is pressed against the molten tips and held in place until the fused tips have solidified.

13. A process according to claim 12 for the manufacture of laminates wherein the porous sheet is metal which process comprises raising the temperature of the porous sheet to a temperature above the softening point of the cuspated core, the heat of the porous sheet causing fusion of the tips of the cusps of the cuspated sheet.

* * * * *